Dec. 10, 1940.  C. A. CHAYNE ET AL  2,224,376
VALVE MECHANISM TEMPERATURE REGULATOR
Filed Nov. 18, 1936  4 Sheets-Sheet 1
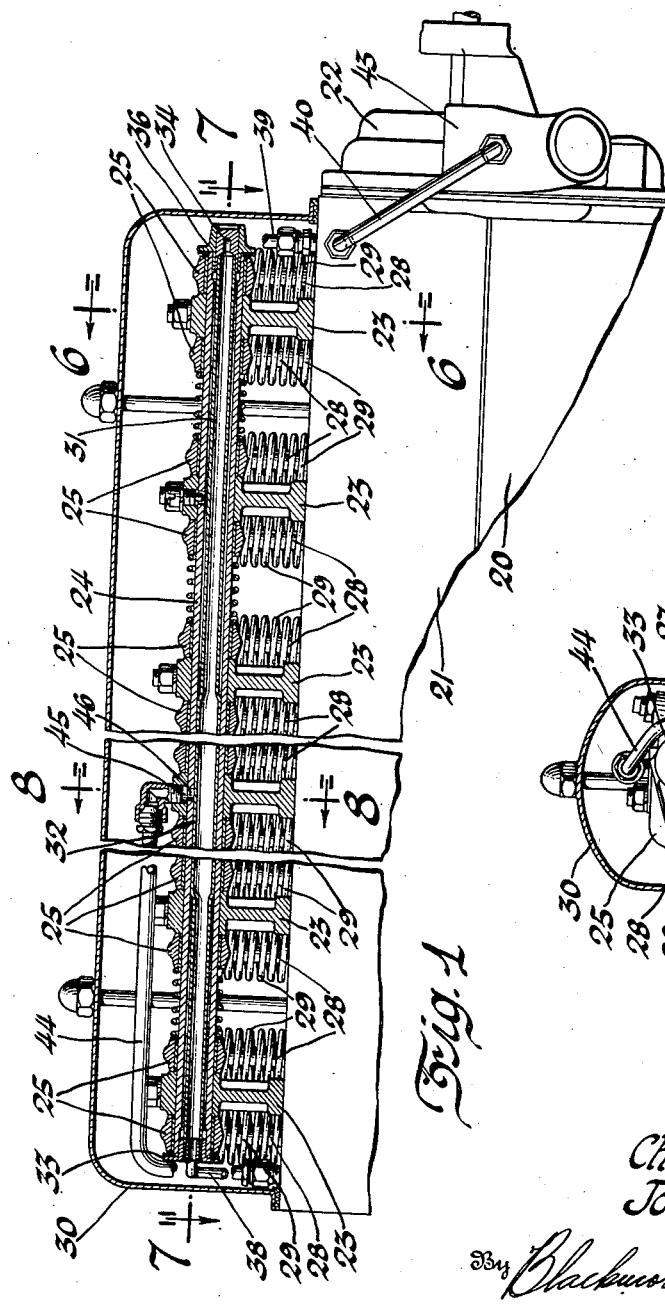
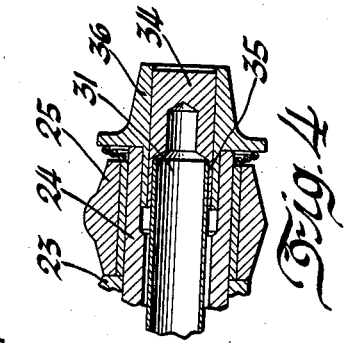
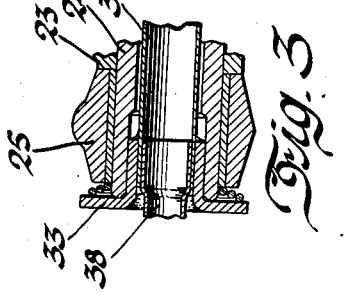
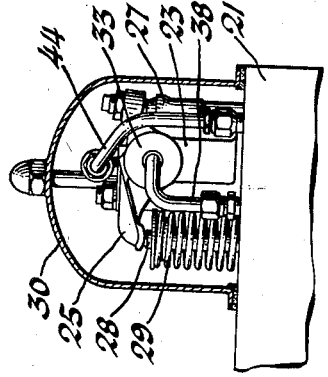
Inventors
Charles A. Chayne &
John Dolza
By Blackmore, Spencer & Hint
Attorneys Dec. 10, 1940.  C. A. CHAYNE ET AL  2,224,376
VALVE MECHANISM TEMPERATURE REGULATOR
Filed Nov. 18, 1936  4 Sheets-Sheet 2

Inventors
Charles A. Chayne &
John Dolza
By Blackmore, Spencer & Hind
Attorneys

Dec. 10, 1940.   C. A. CHAYNE ET AL   2,224,376
VALVE MECHANISM TEMPERATURE REGULATOR
Filed Nov. 18, 1936   4 Sheets-Sheet 3
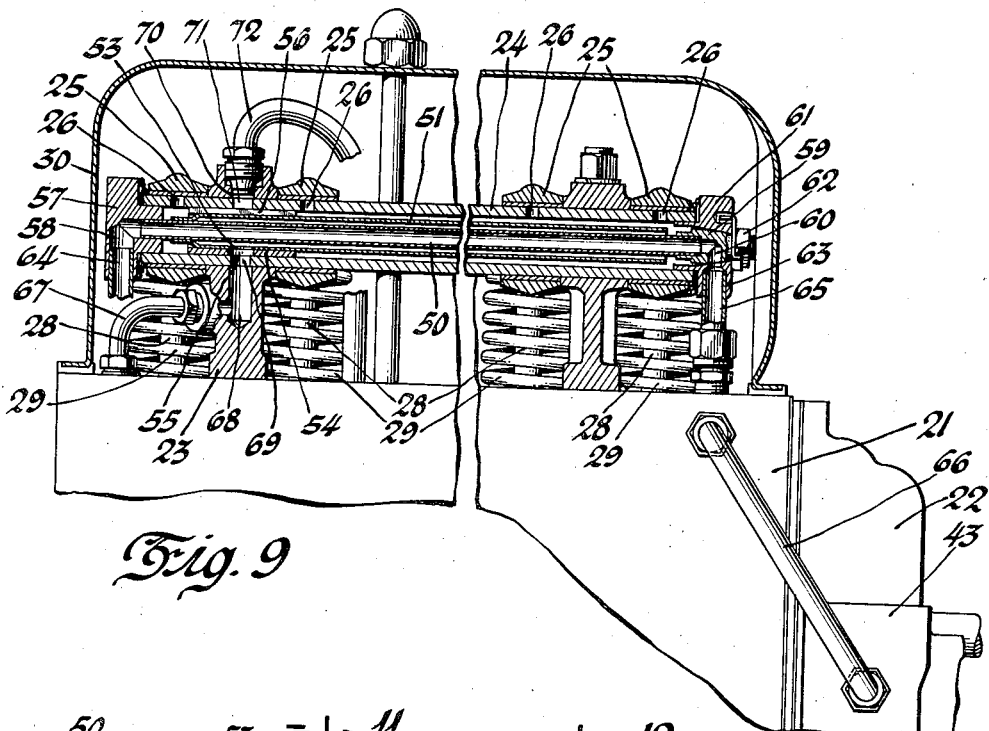
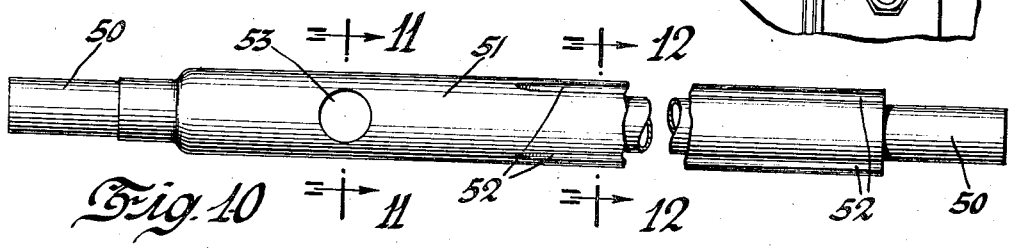
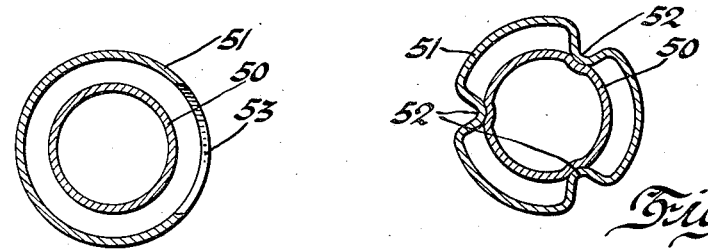
Inventors
Charles A. Chayne &
John Dolza Dec. 10, 1940.　　　C. A. CHAYNE ET AL　　　2,224,376
VALVE MECHANISM TEMPERATURE REGULATOR
Filed Nov. 18, 1936　　　4 Sheets-Sheet 4
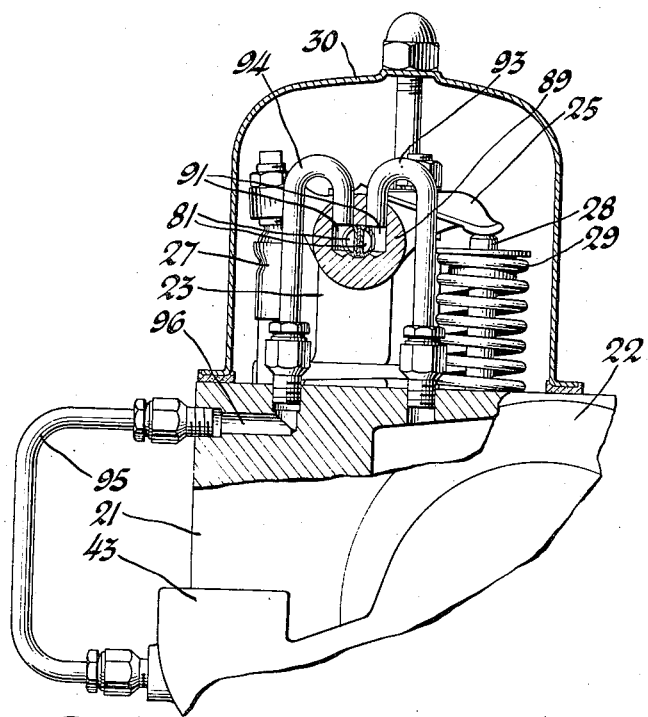
Fig. 13
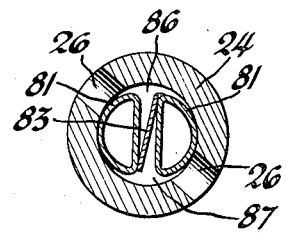
Fig. 16
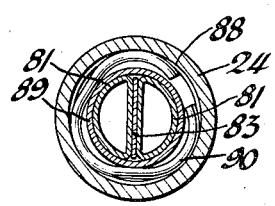
Fig. 17
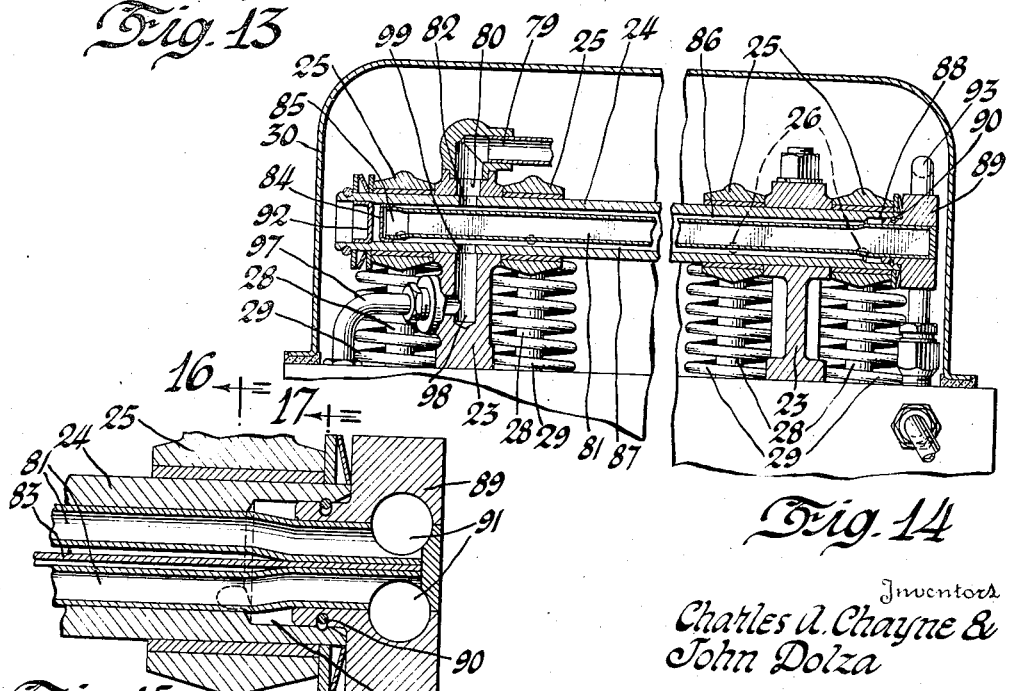
Fig. 14
Fig. 15
Inventors
Charles A. Chayne &
John Dolza
By Blackmore, Spencer & Flint
Attorneys Patented Dec. 10, 1940

2,224,376

UNITED STATES PATENT OFFICE 2,224,376

VALVE MECHANISM TEMPERATURE REGULATOR

Charles A. Chayne and John Dolza, Flint, Mich., assignors to General Motors Corporation, Detroit, Mich., a corporation of Delaware Application November 18, 1936, Serial No. 111,347

18 Claims. (Cl. 123—90)

This invention has to do with internal combustion engine valve mechanisms and has for its principal object to provide means for raising the valve mechanism to its normal operating temperature promptly after the engine is started and preventing the temperature of the valve mechanism exceeding its normal value while the engine is operating so that normal valve operation will be attained as soon as possible after the engine is started and maintained as long as the engine is operating. The regulation of the temperature of the valve mechanism is preferably effected through regulation of the temperature of the lubricant supplied to it with the result that not only is the principal object of the invention attained but also lubrication of the valve mechanism is improved.

For a better understanding of the objects and nature of this invention, reference is made to the following specification wherein are described the preferred embodiments of the invention which are illustrated in the accompanying drawings.

In the accompanying drawings:

Figure 1 is a fragmentary view, partly in side elevation and partly in vertical longitudinal section, of an internal combustion engine with valve mechanism in which our invention is incorporated;

Figure 2 is a fragmentary rear end elevation of the engine shown in Figure 1 with the valve rocker arm cover broken away and in section;

Figures 3 and 4 are enlarged vertical longitudinal sections through the rear and front ends, respectively, of the valve rocker arm shaft and associated parts of the engine shown in the preceding figures;

Figure 9 is a view similar to Figure 1 of an internal combustion engine with valve mechanism in which there is incorporated a modified form of our invention;

Figure 10 is an enlarged view of the tube assembly included in the form of our invention shown in Figure 9;

Figure 5:
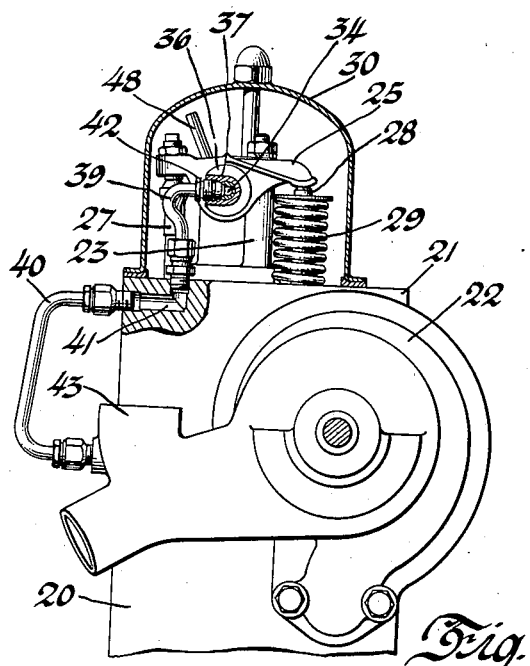
Figure 5 is a fragmentary front end elevation of the engine shown in the preceding figures with parts broken away and in section.
Figure 6:
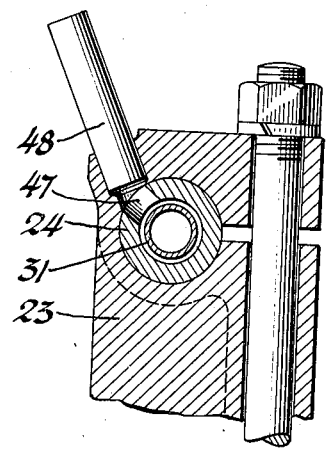
Figure 6 is an enlarged fragmentary section taken as indicated by the line 6—6 of Figure 1.
Figure 7:
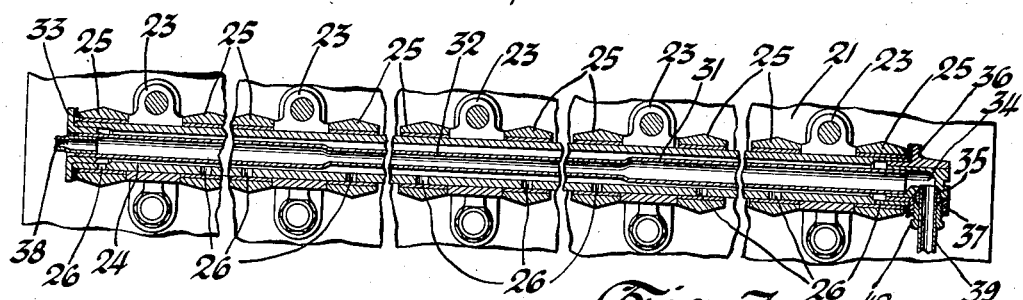
Figure 7 is a section taken as indicated by the line 7—7 of Figure 1.
Figure 8:
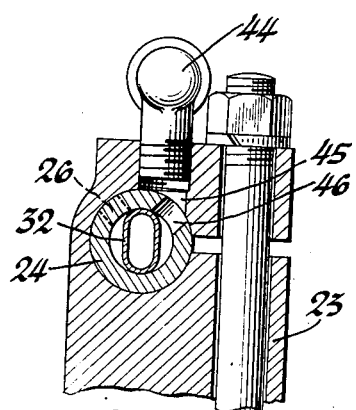
Figure 8 is an enlarged fragmentary section taken as indicated by the line 8—8 of Figure 1.

Figures 11 and 12 are enlarged sections taken, respectively, as indicated by the lines 11—11 and 12—12 of Figure 10;

Figure 13 is a view, similar to Figure 5, of an internal combustion engine in which there is incorporated another form of our invention;

Figure 14 is a view, similar to Figures 1 and 9, of the engine shown in Figure 13;

Figure 15 is an enlarged horizontal longitudinal section through the front end of the valve rocker arm shaft and associated parts of the engine shown in Figures 13 and 14;

Figures 16 and 17 are sections through the rocker arm shaft and associated parts of the engine shown in Figures 13, 14 and 15 taken, respectively, as indicated by the lines 16—16 and 17—17 of Figure 15.

The internal combustion engine shown in the drawings includes a cylinder block 20 to which there is secured a cylinder head 21. To the front end of the engine, there is secured a pump 22 by which cooling water may be circulated through the water jacket of the engine and a water cooling radiator which is not shown in the drawings. On the top of the cylinder head 21, there are mounted brackets 23 in which there is clamped a hollow shaft 24 on which there are mounted rocker arms 25. In the hollow shaft 24, there are orifices 26 through which lubricant may pass from the interior of the shaft to the rocker arm bearings. One end of each of the rocker arms 25 is engaged by a push rod 27 which is actuated by the camshaft of the engine which is not shown in the drawings. The other end of each of the rocker arms engages the upper end of the stem 28 of one of the intake and exhaust valves of the engine. Through the rocker arms 25 the push rods 27 open the intake and exhaust valves at the proper intervals. To close the valves there are provided springs 29 which encircle the upper ends of the stems 28. The elements of the valve mechanism of the engine which are disposed above the upper surface of the cylinder head 21 are enclosed within a removable cover 30.

In the embodiment of the invention shown in Figures 1 to 8, there is included a tube 31 which is cylindrical, except for an intermediate portion 32 about equal in length to one-half of the total length of the tube. The external diameter of the cylindrical portions of the tube 31 is smaller than the internal diameter of the hollow shaft 24. The portion 32 of the tube 31 is flattened sufficiently to make its greater transverse dimension about equal to the internal diameter of the hollow shaft 24.

The tube 31 is installed within the hollow shaft 24 with its cylindrical portions coaxial therewith and the flattish portion 32 disposed vertically with its midpoint opposite one of the brackets 23 which is located about midway between the ends of the shaft. The rear end of the tube 31 is supported and the annular aperture between it and the shaft 24 closed by a flanged collar 33 which snugly embraces and is secured to the end of the tube and fits snugly within a counterbore in the rear end of the shaft. Over the front end of the tube 31, there is snugly sleeved and secured a hollow cap 34 into whose interior there extends a tapered transverse bore 35. The front end of the tube 31 is supported and the annular aperture between the cap 34 and the shaft 24 closed by a collar 36 which is encircled between its ends by a flange. The collar 36 snugly embraces the cap 34 with the portion on one side of the flange fitting snugly within a counterbore in the front end of the shaft 24. Into the portion of the collar on the other side of the flange extends a transverse bore encircled by an internally threaded nipple 37 which is coaxial with the transverse bore 35 in the cap 34.

To conduct water into the tube 31, there is provided a tube 38 which is connected to the engine water jacket at the rear end of the engine and extends into and is secured in the rear end of the tube 31. To conduct water from the tube 31, there are provided tubes 39 and 40 and intersecting bores 41 in the cylinder head 21. One end of the tube 39 extends into the interior of the cap 34 through the nipple 37 on the collar 36 and the bore 35 in the cap. A fitting 42 which is threaded into the nipple 37 and extends into the bore 35 holds this end of the tube 39 in place and also secures the collar 36 to the cap 34. The other end of the tube 39 is connected to one end of the bores 41. The tube 40 is connected to the other end of the bores 41 and to the intake tube 43 of the water pump 22.

Engine lubricant is introduced into the aperture between the tube 31 and the shaft 24 midway between the ends and on one side of the flattish portion 32 by a tube 44, a bore 45 in the bracket 23 which is disposed midway between the ends of the flattish portion and an orifice 46 in the shaft 24 which registers with the bore 45. The tube 44 is connected to the pressure side of the engine lubricant pump and to the outer end of the bore 45.

When the engine shown in Figures 1 to 8 is operating, the engine lubricant pump forces lubricant into the aperture between the tube 31 and the shaft 24 midway between the ends and on one side of the flattish portion 32 of the tube and the water pump draws water through the tube 31 from the rear end of the engine water jacket. From the point at which it is introduced into the aperture between the tube 31 and the shaft 24, the lubricant flows in both directions toward the ends of the aperture. In the embodiment of the invention shown in Figures 1 to 8, all of the orifices 26 in the shaft 24 through which lubricant passes from the aperture between the tube 31 and the shaft 24 to the rocker arm bearings are located on the side of the flattish portion 32 of the tube opposite that in which the orifice 46 is located. Consequently, since the flattish portion of the tube 31 extends all of the way across the interior of the shaft 24, lubricant must remain in heat exchanging relation with the water in the tube 31 for a distance equal at least to about one-quarter of the length of the tube before it can reach any of the orifices 26. This circumstance, of course, increases the efficiency of heat transfer between the water in the tube 31 and the valve mechanism and the introduction of the lubricant near the midpoint of the aperture between the tube 31 and the shaft 24 tends to render more uniform the temperature of the lubricant at different points in the length of the aperture.

Lubricant is introduced into the aperture between the tube 31 and the shaft 24 at a rate slightly in excess of the requirements of the valve mechanism. Therefore, to avoid an undesirable build up of pressure in the aperture and to keep the lubricant in the aperture in motion in order to promote uniformity of temperature at all points in the length of the aperture, there is provided in the upper side of the shaft 24 within the confines of the front bracket 23 an orifice 47 which opens into a short overflow pipe 48 secured in a bore in the bracket. The lubricant which is discharged from the overflow pipe 48 drains back into the crankcase of the engine.

When the engine is first started, the cooling water is heated more rapidly than the lubricant and heat is, consequently, transferred from the cooling water in the tube 31 to the lubricant in the aperture between the tube 31 and the shaft 24 and thence to the elements of the valve mechanism which are disposed above the upper surface of the cylinder head 21. However, after the engine has operated for some time, the temperature of the lubricant exceeds that of the cooling water. Thereafter, heat exchange between the elements of the valve mechanism which are disposed above the upper surface of the cylinder head and the cooling water in the tube 31 through the lubricant in the aperture between the tube 31 and the shaft 24 proceeds in the direction of the cooling water in the tube 31. Consequently, our invention expedites the rise of the valve mechanism to its normal operating temperature after the engine is started and inhibits the temperature of the valve mechanism exceeding its normal valve when the engine is operating. Thus our invention tends to minimize variations in lash and other defects in the operation of the valve mechanism which result from temperature variations or excesses and, because the temperature regulation is effected through the medium of the lubricant for the valve mechanism, to improve the lubrication of the valve mechanism. By regulating the temperature of the lubricant in the valve mechanism, we avoid inefficacious heat gains and losses and are, therefore, able to employ satisfactorily the simple and compact heat exchanger shown in the drawings.

In the embodiment of the invention which is shown in Figures 9 to 12, there is included a tube assembly which consists of a cylindrical tube 50 and a tube 51 whose internal and external diameters are, respectively, larger and smaller than the external diameter of the tube 50 and the internal diameter of the hollow shaft 24. The tube 51 is coaxial with and encircles all except the extremities of the tube 50. At one end, the tube 51 is reduced in diameter sufficiently that it snugly embraces the tube 50 and is secured to it. From a point a short distance from the end of the tube 51 which is reduced in diameter to its other end, there extend elongated indentations 52 which engage the tube 50 and keep the tubes 50 and 51 coaxial. Through the tube 51 near the end which is reduced in diameter, there extends an orifice 53. The portion of the tube 51 through which the orifice 53 extends is snugly embraced by a sleeve 54 whose external diameter is equal to the internal diameter of the hollow shaft 24. In the sleeve 54, there is an orifice 55 which registers with the orifice 53 in the tube 51 and diametrically opposite the orifice a slot 56 which extends the full length of the sleeve.

The tube assembly is installed within the hollow shaft 24 so that it is coaxial with it and with the open end of the tube 51 nearest the front of the engine and the sleeve 54 fitting snugly within the shaft 24. The rear end of the assembly is supported and the annular aperture between it and the shaft 24 closed by a cap 57 with an enlarged head. The cap fits snugly within the rear end of the shaft 24 and is sleeved snugly around and secured to the rear end of the tube 50. Into the interior of the cap 57 through its enlarged head extends a transverse bore 58. Over the front end of the tube 50, there is snugly sleeved and secured an externally tapered cap 59 into whose interior there extends a transverse bore 60. The front end of the tube assembly is supported and the annular aperture between the cap 59 and the shaft 24 closed by an annular fitting 61 in which the tapered portion of the cap fits snugly with a tubular extension which fits snugly within the front end of the shaft 24. The fitting 61 is secured to the cap 59 by a nut 62 threaded on a boss on the outer end of the cap. Into the fitting 61, there extends a transverse bore 63 which is coaxial with and opens into the bore 60 in the cap 59.

Water is conducted into the rear end of the tube 50 through a tube 64 which is connected to the engine water jacket at the rear end of the engine and extends into and is secured in the bore 58 in the cap 57. Water is conducted from the front end of the tube 50 through tubes 65 and 66 and intersecting bores in the cylinder head 21 which are not shown in the drawings. The tube 65 extends into and is secured in the bore 63 in the fitting 61 and is connected to one end of the intersecting bores in the cylinder head. The tube 66 is connected to the other end of the intersecting bores in the cylinder head and to the intake tube 43 of the water pump 22.

Engine lubricant is conducted into the aperture between the tubes 50 and 51 by a tube 67, a bore 68 in the rearmost bracket 23, an orifice 69 in the shaft 24 and the orifices 56 and 53 in the sleeve 54 and tube 51 with which the bore 68 and the orifice 69 are alined. The tube 67 is connected to the pressure side of the engine lubricant pump and to the inner end of the bore 68 in the bracket 23. From the orifice 53 in the tube 51, the lubricant flows through the aperture between the tubes 50 and 51 toward the front of the engine, out of the front end of this aperture into the aperture between the tube 51 and the shaft 24 and through the last-mentioned aperture toward the rear of the engine. The lubricant reaches the rearmost of the bores 26 through the slot 56 in the sleeve 54. To the upper side of the aperture between the tube 51 and the shaft 24, there is connected through a bore 70 in the rearmost bracket 23 and an orifice 71 in the shaft 24 which opens into the slot 56 in the sleeve 54 an overflow tube 72 which leads to the crankcase of the engine.

In the embodiment of the invention which is shown in Figures 13 to 17, there is included a tube assembly which includes two tubes 81 which are D-shaped in cross section. The tubes 81 are assembled with their flat sides facing each other and a strip 83 interposed between them. The tubes 81 are secured to opposite sides of the strip 83 at their ends and at one end are expanded to fit snugly within a cap 84 whose external diameter is equal to the internal diameter of the shaft 24 and is secured to them. The juxtaposed portions of the ends of the tubes 81 and the strip 83 which extend into the cap are, as indicated at 85, cut away to establish communication between the tubes at that end. Between their ends, the tubes 81 are spread apart sufficiently that they will span the interior of the shaft 24 and the strip 83 is twisted so that it bridges the gap between the tubes.

The tube assembly is disposed within the hollow shaft 24 with the end over which the cap 84 is secured located nearest the rear end of the shaft. The tube assembly spans the interior of the shaft 24 horizontally but its upper and lower sides are separated therefrom by apertures 86 and 87. The rear ends of the apertures 86 and 87 are closed by the cap 84. A counterbore 88 in the front end of the shaft 24 establishes communication between the front ends of the apertures 86 and 87. The front end of the tube assembly is supported and the aperture between it and the counterbore 88 closed by a cap 89 with an enlarged head which snugly embraces and is secured to the front end of the tube assembly and fits snugly within the counterbore 88. The cap 89 is secured in place in the counterbore 88 by a spring ring 90. Into the enlarged head of the cap 89 extend two transverse bores 91 of which each opens into one of the tubes 81. The rear end of the shaft 24 is closed by a plug 92.

Water is conducted into the front end of one of the tubes 81 by a tube 93 which is connected to the engine water jacket at the front end of the engine and extends into and is secured in one of the bores 91 in the cap 89. From the front end of the mentioned tube 81, the water flows toward the rear of the engine, passes through the orifice 85 into the other tube 81 and flows therethrough toward the front of the engine. From the front end of the last-mentioned tube 81, the water is conducted to the intake tube 43 of the water pump 22 by tubes 94 and 95 and intersecting bores 96 in the cylinder head 21. The tube 94 extends into and is secured in the bore 91 in the cap 89 to which the tube 93 is not connected and is connected to one end of the intersecting bores 96. The tube 95 is connected to the other end of the intersecting bores 96 and to the intake tube 43 of the water pump 22.

Engine lubricant is conducted into the aperture 87 between the lower side of the tube assembly and the shaft 24 near its closed end through a tube 97 which is connected to the pressure side of the engine lubricant pump, a bore 98 in the rearmost bracket 23 to which the tube 97 is connected and an orifice 99 in the shaft 24 into which the bore 98 opens. From the bore 99, the lubricant flows through the aperture 87 toward the front of the engine and passes through the counterbore 88 in the front end of the shaft into the aperture 86 through which it flows toward the rear of the engine. To the aperture 86 near its closed end, there is connected through an orifice 82 in the shaft 24 and a bore 80 in the rearmost bracket 23 an overflow tube 79 which leads to the crankcase of the engine.

In general, the modi operandi of the embodiments of the invention which are shown in Figures 9 to 12 and 13 to 17 are similar to that of the embodiment shown in Figures 1 to 8 which has been fully described. The respects in which the modi operandi of the embodiments shown in Figures 9 to 12 and 13 to 17 differ from that of the embodiment shown in Figures 1 to 8 and the advantages of the embodiments shown in Figures 9 to 12 and 13 to 17 seem apparent from what we have said concerning the latter specifically. We, therefore, deem any further description of the modi operandi of the embodiments shown in Figures 9 to 12 and 13 to 17 and a discussion of their advantages unnecessary.

We claim:

1. In an internal combustion engine, a liquid temperature regulating system in which there is included a temperature regulating liquid jacket and means for circulating temperature regulating liquid therethrough, means for advancing lubricant to moving parts, valve mechanism which includes a hollow shaft, a tube which extends through and is radially spaced from the hollow shaft except in a zone between the ends of the shaft and the tube at which it is flattened sufficiently to make its greater transverse dimension substantially equal to the internal diameter of the hollow shaft, means by which lubricant advanced by the second specified means is introduced into the aperture between the hollow shaft and the tube on one side of the flattened zone of the tube, valve rocker arms mounted on the hollow shaft, orifices in the hollow shaft through which lubricant may pass from the aperture between the hollow shaft and the tube to the valve rocker arm bearings, and means by which one end of the tube is connected to the temperature regulating liquid jacket of the engine and the other to the intake side of the first specified means so that engine temperature regulating liquid flows through the tube in heat exchanging relation with the lubricant in the aperture between the hollow shaft and the tube when the engine is operating.

2. In an internal combustion engine, a liquid temperature regulating system in which there is included a temperature regulating liquid jacket and means for circulating temperature regulating liquid therethrough, means for advancing lubricant to moving parts, valve mechanism which includes a hollow shaft, a tube which extends through and is radially spaced from the hollow shaft, a tube which encircles the first specified tube and is radially spaced from it and the hollow shaft and closed at one end, means by which lubricant advanced by the second specified means is introduced into the aperture between the specified tubes near the closed end of the second specified tube, valve rocker arms mounted on the hollow shaft, orifices in the hollow shaft through which lubricant may pass from the aperture between the hollow shaft and the second specified tube to the valve rocker arm bearings, and means by which one end of the first specified tube is connected to the temperature regulating liquid jacket of the engine and the other to the intake side of the first specified means so that engine temperature regulating liquid flows through the first specified tube in heat exchanging relation with the lubricant in the aperture between the specified tubes when the engine is operating.

3. In an internal combustion engine, a liquid temperature regulating system in which there is included a temperature regulating liquid jacket and means for circulating temperature regulating liquid therethrough, means for advancing lubricant to moving parts, valve mechanism which includes a hollow shaft, a member in which there is a U-shaped duct and subdivides the hollow shaft transversely except at one end, means by which lubricant advanced by the second specified means is introduced into one of the apertures between the hollow shaft and the specified member near the end at which the apertures do not communicate, valve rocker arms mounted on the hollow shaft, orifices in the hollow shaft through which lubricant may pass from one of the apertures between it and the specified member to the valve rocker arm bearings, and means by which one leg of the U-shaped duct is connected to the temperature regulating liquid jacket of the engine and the other to the intake side of the first specified means so that engine temperature regulating liquid flows through the duct in heat exchanging relation with the lubricant in the apertures between the hollow shaft and the duct when the engine is operating.

4. In an internal combustion engine, a liquid temperature regulating system which includes a temperature regulating liquid jacket and means for circulating temperature regulating liquid therethrough, means for advancing lubricant to moving parts, valve mechanism which includes a hollow shaft, a member in which there is a U-shaped duct disposed within the hollow shaft so that there is an aperture between it and the hollow shaft, means by which lubricant advanced by the second specified means is introduced into the aperture between the hollow shaft and the specified member, valve rocker arms mounted on the hollow shaft, orifices in the hollow shaft through which lubricant may pass from the aperture between it and the specified member to the valve rocker arm bearings, and means by which the first specified means is connected to one leg of the U-shaped duct so that engine temperature regulating liquid flows through the duct in heat exchanging relation with the lubricant in the aperture between the hollow shaft and the duct when the engine is operating.

5. In an internal combustion engine, a liquid temperature regulating system which includes a temperature regulating liquid jacket and means for circulating temperature regulating liquid through it, means for advancing lubricant to moving parts, valve mechanism which includes a hollow shaft, a tube which is disposed within the hollow shaft so that there is an aperture between it and the hollow shaft, means by which lubricant advanced by the second specified means is introduced into the aperture between the tube and the hollow shaft so that it flows toward one and then toward the other end of the hollow shaft, valve rocker arms mounted on the hollow shaft, orifices in the hollow shaft through which lubricant may pass from the aperture between the hollow shaft and the tube to the valve rocker arm bearings, and means by which the first specified means is connected to one end of the tube so that engine temperature regulating liquid flows through the latter in heat exchanging relation with the lubricant in the aperture between the tube and the hollow shaft when the engine is operating.

6. In an internal combustion engine, a liquid temperature regulating system which includes a temperature regulating liquid jacket and means for circulating temperature regulating liquid through it, means for advancing lubricant to moving parts, valve mechanism which includes a hollow shaft, a tube which extends through and is radially spaced from the hollow shaft except in a zone between the ends of the hollow shaft and the tube at which it is flattened sufficiently to make its greater transverse dimension substantially equal to the internal diameter of the hollow shaft, means by which lubricant advanced by the second specified means is introduced into the aperture between the hollow shaft and the tube on one side of the flattened zone of the tube, valve rocker arms mounted on the hollow shaft, orifices in the hollow shaft through which lubricant may pass from the aperture between the hollow shaft and the tube to the valve rocker arm bearings, and means by which the first specified means is connected to one end of the tube so that engine temperature regulating liquid flows through the latter in heat exchanging relation with the lubricant in the aperture between the tube and the hollow shaft when the engine is operating.

7. In an internal combustion engine, a liquid temperature regulating system which includes a temperature regulating liquid jacket and means for circulating temperature regulating liquid through it, means for advancing lubricant to moving parts, valve mechanism which includes a hollow shaft, a tube which extends through and is radially spaced from the hollow shaft, a tube which encircles the first specified tube and is radially spaced from it and the hollow shaft and closed at one end, means by which lubricant advanced by the second specified means is introduced into the aperture between the specified tubes near the closed end of the second specified tube, valve rocker arms mounted on the hollow shaft, orifices in the hollow shaft through which lubricant may pass from the aperture between the hollow shaft and the second specified tube to the valve rocker arm bearings, and means by which the first specified means is connected to one end of the first specified tube so that engine temperature regulating liquid flows through the latter in heat exchanging relation with the lubricant in the aperture between the specified tubes when the engine is operating.

8. In an internal combustion engine, a liquid temperature regulating system which includes a temperature regulating liquid jacket and means for circulating temperature regulating liquid through it, means for advancing lubricant to moving parts, valve mechanism which includes a hollow shaft, a member in which there is a U-shaped duct and subdivides the hollow shaft transversely except at one end, means by which lubricant advanced by the second specified means is introduced into one of the apertures between the hollow shaft and the specified member near the end at which the apertures do not communicate, valve rocker arms mounted on the hollow shaft, orifices in the hollow shaft through which lubricant may pass from one of the apertures between it and the specified member to the valve rocker arm bearings, and means by which the first specified means is connected to one leg of the U-shaped duct so that engine temperature regulating liquid flows through the duct in heat exchanging relation with the lubricant in the apertures between the hollow shaft and the duct when the engine is operating.

9. In valve mechanism which includes a hollow shaft, a member mounted so that it rocks on the hollow shaft, an orifice which leads from the interior of the hollow shaft to the bearing of the member on the hollow shaft, and means for advancing lubricant into the hollow shaft and thence through the orifice to the bearing of the member on the hollow shaft: means for regulating the temperature of the valve mechanism including a tube within the hollow shaft, and means for advancing a temperature regulating medium through the tube in heat exchanging relation to the lubricant within the hollow shaft.

10. In valve mechanism which includes a hollow shaft, members mounted so that they rock on the hollow shaft at different points in its length, an orifice which leads from the interior of the hollow shaft to the bearing of each of the members on the hollow shaft, and means for advancing lubricant into the hollow shaft and thence through the orifices to the bearings of the members on the hollow shaft: means for regulating the temperature of the valve mechanism including a tube which is disposed within the hollow shaft and extends approximately from the orifice nearest one to the orifice nearest the other end of the hollow shaft, and means for advancing a temperature regulating medium through the tube in heat exchanging relation to the lubricant within the hollow shaft.

11. In an internal combustion engine which includes a liquid temperature regulating system with means in it for advancing temperature regulating liquid through the system, a lubricating system with means in it for advancing lubricant through the system, and valve mechanism which includes a hollow shaft, a member mounted so that it rocks on the hollow shaft, and an orifice which leads from the interior of the hollow shaft to the bearing of the member on the hollow shaft, the means for advancing lubricant through the lubricating system being connected to the hollow shaft so that it advances lubricant into the hollow shaft and thence through the orifice to the bearing of the member on the hollow shaft: means for regulating the temperature of the valve mechanism including a tube within the hollow shaft connected to the means for advancing temperature regulating liquid through the temperature regulating system so that the latter advances temperature regulating liquid through the tube in heat exchanging relation to the lubricant within the hollow shaft.

12. In an internal combustion engine which includes a liquid temperature regulating system with means in it for advancing temperature regulating liquid through the system, a lubricating system with means in it for advancing lubricant through the system, and valve mechanism which includes a hollow shaft, members mounted so that they rock on the hollow shaft at different points in its length, and an orifice which leads from the interior of the hollow shaft to the bearing of each of the members on the hollow shaft, the means for advancing lubricant through the lubricating system being connected to the hollow shaft so that it advances lubricant into the hollow shaft and thence through the orifices to the bearings of the members on the hollow shaft: means for regulating the temperature of the valve mechanism including a tube which is disposed within the hollow shaft and extends approximately from the orifice nearest one to the orifice nearest the other end of the hollow shaft and is connected to the means for advancing temperature regulating liquid through the temperature regulating system so that the latter advances temperature regulating liquid through the tube in heat exchanging relation to the lubricant within the hollow shaft.

13. In valve mechanism, a hollow shaft, members mounted so that they rock on the hollow shaft at different points in its length, an orifice which leads from the interior of the hollow shaft to the bearing of each of the members on the hollow shaft, means for advancing lubricant into the hollow shaft and thence through the orifices to the bearings of the members on the hollow shaft, and means for regulating the temperature of the valve mechanism including a tube within the hollow shaft and means for advancing a temperature regulating medium through the tube in heat exchanging relation to the lubricant within the hollow shaft—the arrangement being such that it tends to effect uniform regulation of the temperature of the valve mechanism at the several points in the length of the hollow shaft that the members are mounted on it.

14. In an internal combustion engine, a liquid temperature regulating system with means in it for advancing temperature regulating liquid through the system, a lubricating system with means in it for advancing lubricant through the system, valve mechanism which includes a hollow shaft, members mounted so that they rock on the hollow shaft at different points in its length, an orifice which leads from the interior of the hollow shaft to the bearing of each of the members on the hollow shaft, the means for advancing lubricant through the lubricating system being connected to the hollow shaft so that it advances lubricant into the hollow shaft and thence through the orifices to the bearings of the members on the hollow shaft, and means for regulating the temperature of the valve mechanism including a tube which is disposed within the hollow shaft and connected to the means for advancing temperature regulating liquid through the temperature regulating system so that the latter advances temperature regulating liquid through the tube in heat exchanging relation to the lubricant within the hollow shaft—the arrangement being such that it tends to effect uniform regulation of the temperature of the valve mechanism at the several points in the length of the hollow shaft that the members are mounted on it.

15. In valve mechanism, a hollow shaft, members mounted so that they rock on the hollow shaft at different points in its length, an orifice which leads from the interior of the hollow shaft to the bearing of each of the members on the hollow shaft, means for introducing lubricant into the hollow shaft approximately midway between its ends and advancing lubricant from the interior of the hollow shaft through the orifices to the bearings of the members on the hollow shaft, and means for regulating the temperature of the valve mechanism including a tube which is disposed within the hollow shaft and extends approximately from the orifice nearest one to the orifice nearest the other end of the hollow shaft and means for advancing a temperature regulating medium through the tube in heat exchanging relation to the lubricant within the hollow shaft.

16. The valve mechanism claimed in claim 15 in which the orifices are disposed on the side of the tube opposite that on which lubricant is introduced into the hollow shaft.

17. The internal combustion engine defined by claim 1 in which the orifices are disposed on the side of the tube opposite that on which lubricant is introduced into the aperture between the hollow shaft and the tube.

18. The internal combustion engine defined by claim 6 in which the orifices are disposed on the side of the tube opposite that on which lubricant is introduced into the aperture between the hollow shaft and the tube.

CHARLES A. CHAYNE.
JOHN DOLZA.